United States Patent [19]

Vitins

[11] 4,179,651
[45] Dec. 18, 1979

[54] METHOD AND APPARATUS FOR SUPERVISING AN ELECTRICAL LINE FOR SHORT CIRCUITS

[75] Inventor: Michael Vitins, Zurich, Switzerland

[73] Assignee: BBC Brown Boveri & Company Limited, Switzerland

[21] Appl. No.: 835,852

[22] Filed: Sep. 22, 1977

[30] Foreign Application Priority Data

Sep. 30, 1976 [CH] Switzerland .................. 12360/76

[51] Int. Cl.² ........................................ G01R 31/02
[52] U.S. Cl. .................................. 324/51; 361/79
[58] Field of Search .................. 324/51, 52; 361/79, 361/80; 340/650

[56] References Cited

U.S. PATENT DOCUMENTS

| | | | |
|---|---|---|---|
| 4,063,160 | 12/1977 | Lanz et al. ......................... | 324/52 |
| 4,063,162 | 12/1977 | Lanz et al. ......................... | 324/52 |
| 4,063,164 | 12/1977 | Lanz et al. ......................... | 324/52 |
| 4,063,165 | 12/1977 | Lanz ................................... | 324/52 |
| 4,063,166 | 12/1977 | Glavitsch et al. ................. | 324/52 |

Primary Examiner—Gerard R. Strecker
Attorney, Agent, or Firm—Haseltine, Lake & Waters

[57] ABSTRACT

An arrangement for supervising an electrical line for short circuits in which current and voltage signals are derived from the line current and line voltage at a predetermined measuring point. The current and voltage signals are relatively weighted by multiplying at least one of these signals by a weighting factor which is at least approximately free of phase rotation. At least one auxiliary signal is formed corresponding to the sum or difference in each case of a pair of relatively weighted current and voltage signals. An amplitude comparison is carried out between the auxiliary signal and a reference signal. The weighting factor is related to the current signal and the voltage signal, and is a quantity at least approximately corresponding to the characteristic line resistance or its reciprocal value. Two auxiliary signals may be formed by addition and subtraction respectively of a pair of relatively weighted current and voltage signals, and one of these auxiliary signals is used, in the amplitude comparison, as a reference signal for the other.

14 Claims, 10 Drawing Figures

METHOD AND APPARATUS FOR SUPERVISING AN ELECTRICAL LINE FOR SHORT CIRCUITS

BACKGROUND OF THE INVENTION

The present invention relates to a method of supervising an electrical line for short circuits and an arrangement of apparatus for performing such method. The preferred field of application of the invention is the supervision of high voltage lines in energy transmission networks.

Short circuits in electrical lines can be detected, for example, by supervising the input impedance of a section of the line, in particular the real component of such input impedance, i.e., the input resistance. It is possible, however, in extreme loading conditions, which in some circumstances are still acceptable but in any case would not be treated as a short circuit, that the input resistance can get into ranges of magnitude which overlap those of short circuiting conditions and which therefore, on the one hand, prevent a sufficiently reliable short circuit detection from being achieved but, on the other hand, do not prevent unnecessary circuit disconnections.

The object of the invention is therefore to provide a method of short circuit supervision, which, as compared with a mere supervision of the input resistance, is distinguished by a higher grade of discrimination between short circuit conditions and extreme loading conditions.

As will be more particularly described, it is possible that the amplitude relationships created in the proposed manner can be reproduced—as one of the possible types of quantities resulting from amplitude comparison—in the form of characteristics dependent upon the variable fault resistance or terminating resistance, thus making possible a clear distinction between the short circuit-region and the operating region.

SUMMARY OF THE INVENTION

The objects of the present invention are achieved by providing a circuit arrangement in which a measuring station has measuring devices for line current and line voltage, as well as transformers for converting these quantities into current and voltage signals. A multiplication or division circuit, which is at least approximately free of phase rotation, is provided for the relative weighting of the current and voltage signals. An additive superimposing circuit for logical coupling of the weighted current and voltage signals is also included. A comparison circuit performs an amplitude comparison between an auxiliary signal and a reference signal derived from a signal generator having an additive logic circuit with an input side connected to a relatively weighted current and voltage signal. The reference signal generator can also be comprised of a current signal transmission member. The comparison circuit includes a circuit for forming amplitude signals, a quotient former, and at least one limiting value switch connected to the output of the comparison circuit. The circuit for forming amplitude signals may be in the form of at least two time integrators for each input signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
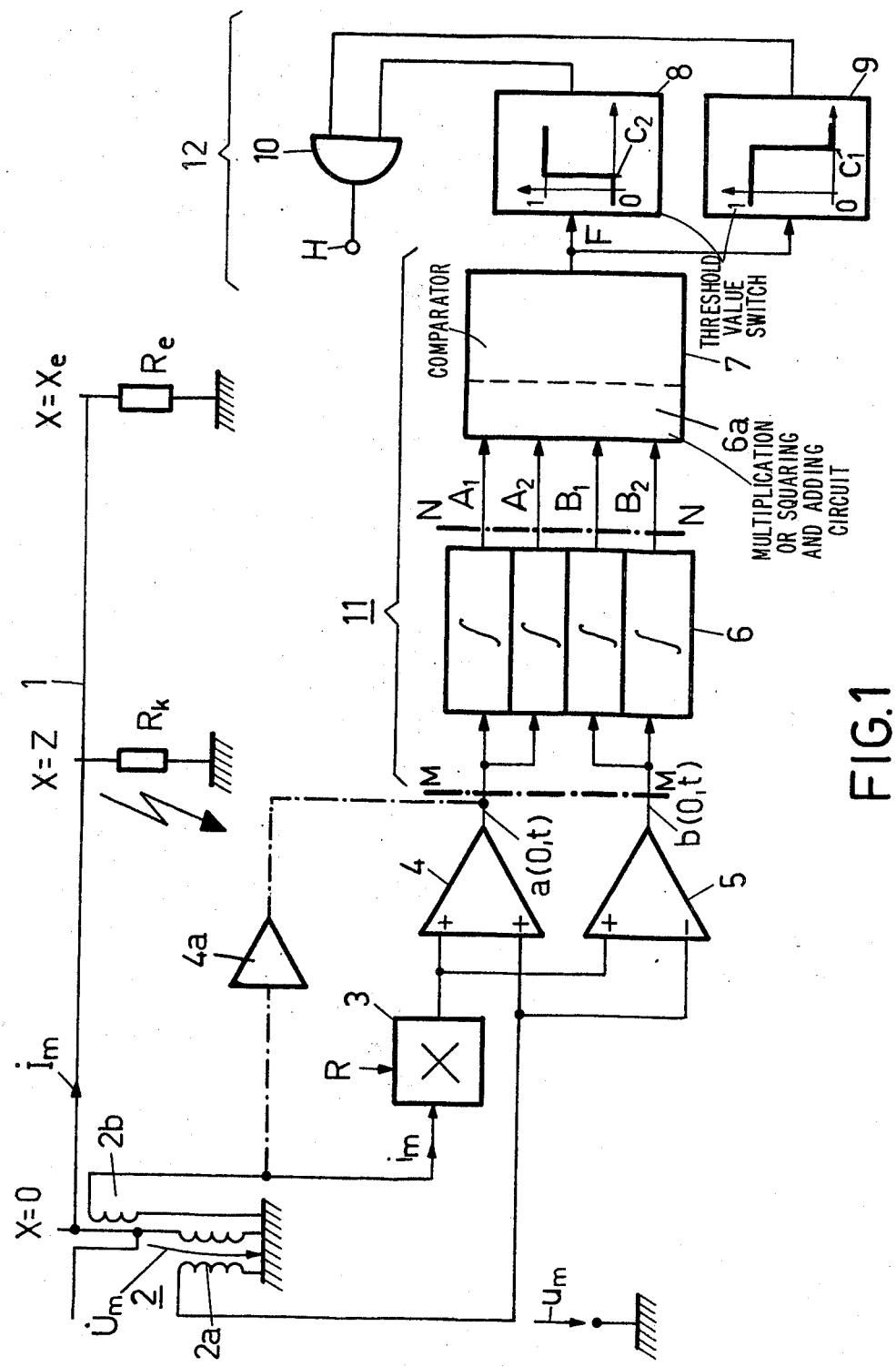
FIG. 1 is a schematic diagram of one section of a line to be supervised together with a simplified plan of a circuit arrangement for supervising short circuits.

An imaginary longitudinal coordinate x of a section 1 of the line to be supervised has, according to FIG. 1, at the starting point of the line at a measuring station 2, the value $x=0$, while at the fault location with the short circuiting resistance $R_k$ it has the value $x=z=$ fault distance and at the end of the line terminating resistance $R_e$, it has the value $x=x_e$. At the measuring point $x=0$, the line current $\dot{I}_m$ and line voltage $\dot{U}_m$ (written in complex form) are converted into current and voltage signals $i_m$ and $u_m$ respectively, this being effected by means of transformers 2b and 2a. A multiplier 3 provides a relative weighting between the current signal and the voltage signal, for example, in this case by forming $R.i_m$ corresponding to $R.\dot{I}_m$, in which R is a weighting factor and which is at least approximately free of phase rotation or is real, and has the dimension of resistance. In a summation circuit having an addition member 4 and a substration member 5 there are produced auxiliary signals $a(O,t)$ and $b(O,t)$, which are associated with the measuring point $x=0$ and with the time t, so that $a=u_m+R.i_m$ and $b=-u_m+R.i_m$. Accordingly, using the complex line quantities $$\dot{A}=\dot{U}_m+R.\dot{I}_m \text{ and } \dot{B}=-\dot{U}_m+R.\dot{I}_m.$$

Following the summation circuit is a comparison circuit 11 in which is carried out an amplitude comparison between an auxiliary signal and a reference signal. For example, in this case one of the auxiliary signals serves as a reference signal for the other, a being a reference signal for b. Instead of doing this, the current signal $i_m$ itself, or a current-proportional signal, may be adopted as a reference signal, this being effected by a channel indicated in dash and dot lines containing a transmission member 4a.

The comparison circuit 11 comprises an integration circuit 6 for forming time integrals $A_1$, $A_2$, $B_1$, $B_2$, which represent approximated Fourier components of the complex quantities $\dot{A}$ and $\dot{B}$ having a predetermined frequency from the spectrum of the corresponding time signals, preferably of the mains network frequency. These are superimposed in a multiplication, or squaring and summation circuit 6a to produce quantities in conformity with amplitude. Following this circuit is a comparator 7, as for example a quotient former, delivering the comparison signal F at the output, which is further processed in a limiting value circuit 12 having two limiting value switches 8 and 9. A logic circuit 10 combines the results, for example so that at the final output H, a signal is produced when, and only when, the comparison signal F lies between the limiting values $C_1$ and $C_2$.

Figure 2:
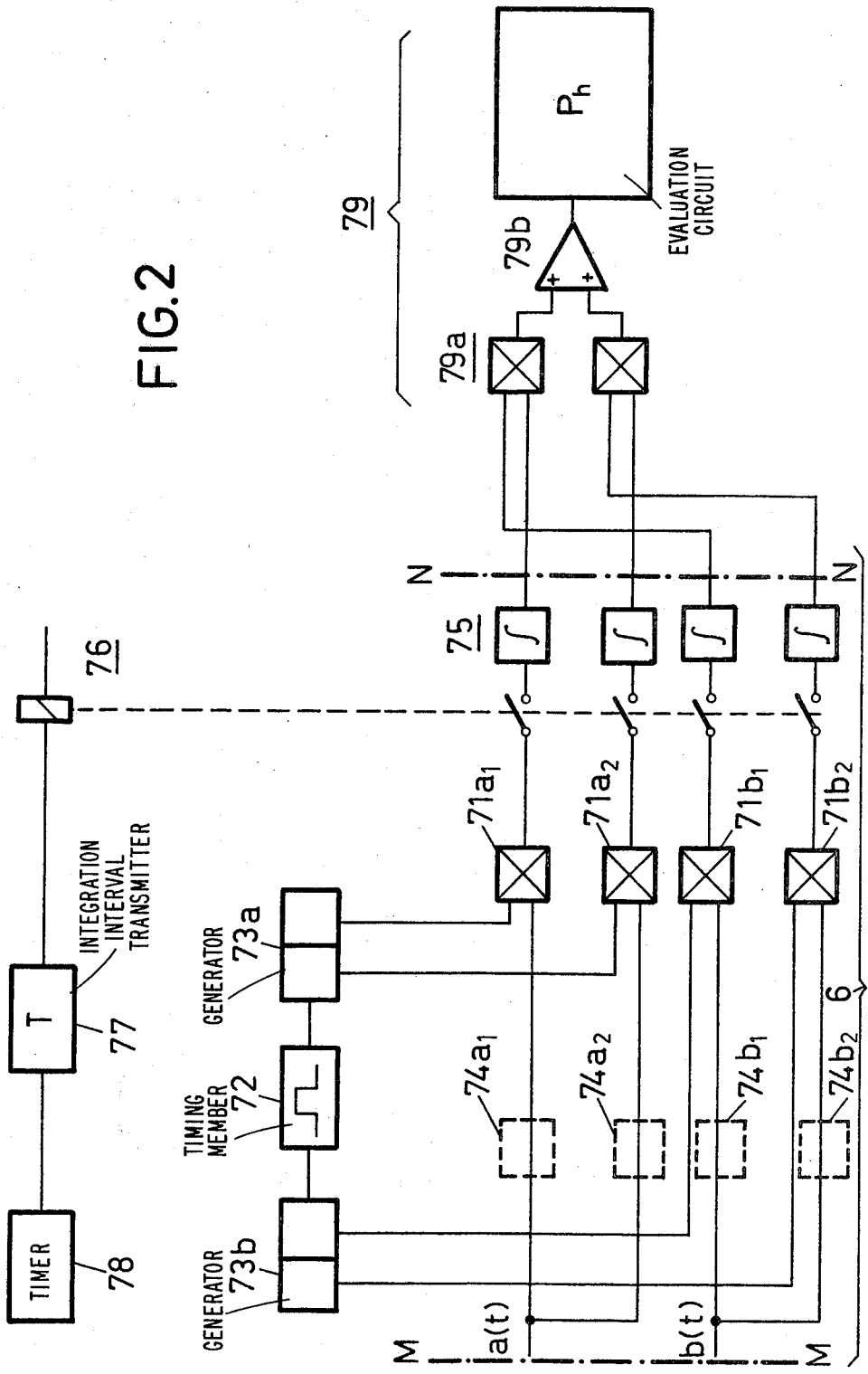
FIGS. 2 and 3 show respectively the portion of the circuit according to FIG. 1 in more detail.

The integration circuit 6 comprises, according to FIG. 2, a set 75 of integrators with associated input contacts of a relay 76 for determining the integration intervals by means of a time member 77 corresponding to the integration time duration T and a pulse generator 78. With the object of performing a correlative filtering for deriving orthogonal components, a and b are respectively multiplied by pairs of periodic weighting functions mutually displaced in time, which are taken from suitably paired outputs of generators $73a$, $73b$ and delivered through respective a and b multipliers $71a_1$, $71a_2$, $71b_1$, $71b_2$. In the present example there is also introduced a time displacement between the weighting functions for a and b, this being effected by means of a time member 72. This feature serves for the introduction of a reference phase displacement between $\dot{A}$ and $\dot{B}$ for the purposes of additional phase and error distance detection. The time displacement for the formation of orthogonal components can also be effected by means of time delay members $74a_1$, $74a_2$, $74b_1$, $74b_2$, in the signal channels for a and b.

For clarifying the relationship between FIGS. 2 and 1 the separation lines of the integration circuit are indicated by M—M and N—N.

Moreover in FIG. 2 there is indicated a phase detector 79, which comprises a multiplier circuit $79a$ as well as an addition member $79b$ and an evaluation circuit Ph. At this position, for example, there is formed an expression $A_1.B_1+A_2.B_2$ the sign of which decides the approximate identity of phase or opposite phase of $\dot{A}$ and $\dot{B}$.

Moreover it is to be understood that instead of the components of $\dot{A}$ and $\dot{B}$ after relative weighting and formation of a, b, it is also possible to employ suitable operations with $u_m$ and $R.i_m$, including integration, taking place before additive superimposition. In the simplest case this then results in suitably resolved expressions with current and voltage integrals $I_1$, $I_2$, $U_1$, $U_2$ and again the weighting factor R in the terms $R.I_1$ and $R.I_2$. These latter will, besides, be introduced when employing current signals as the references signal for amplitude comparison.

Figure 3:
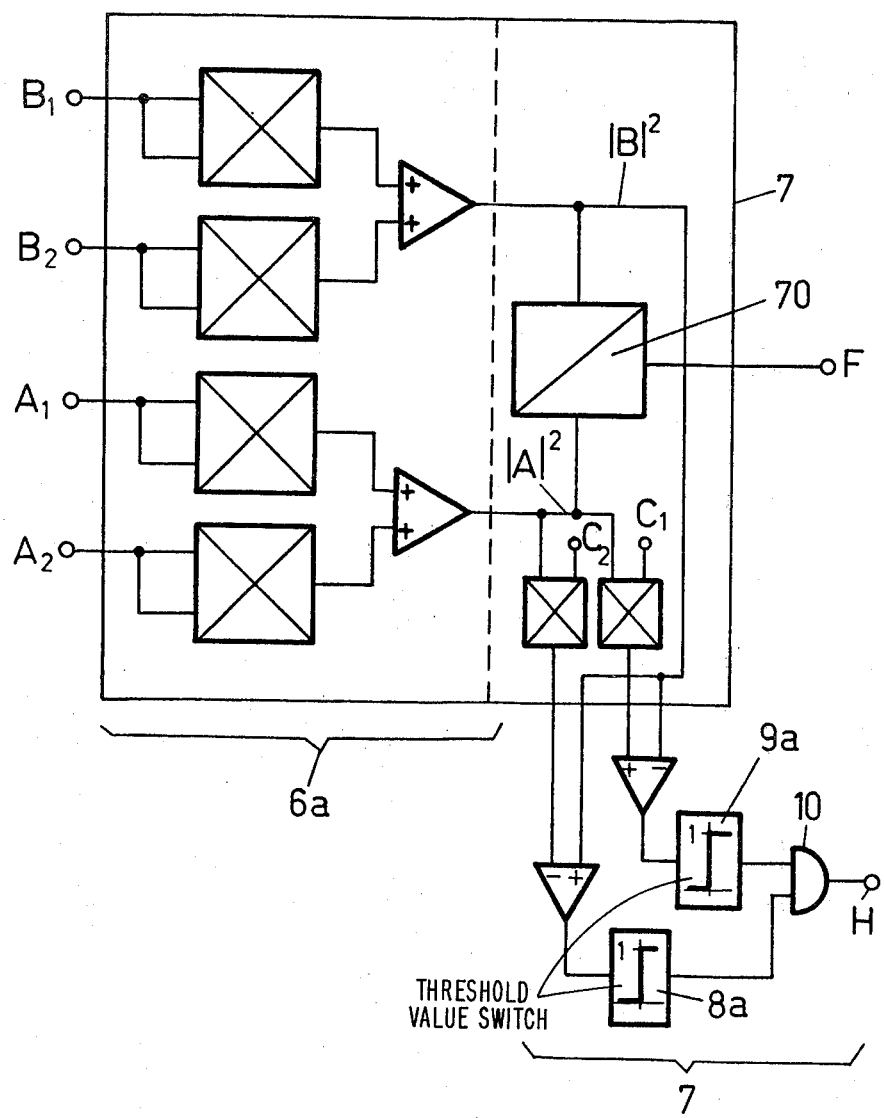

The squaring and summation circuits $6a$ shown in FIG. 3, to which are delivered the time integrals $A_1$, $A_2$, $B_1$, $B_2$, or, to which, in the sense of the foregoing observation, the current signal intervals $I_1$, $I_2$ are delivered instead of each of these pairs of auxiliary signal integrals, forms the amplitude quantities $A^2$ and $B^2$, or respectively $I^2$. These quantities are delivered to a quotient producer 70 in the compairson circuit 7, the output of which quotient producer delivers the already mentioned comparison signal F. Instead of performing the quotient producing operation, the already mentioned limiting values $C_1$ and $C_2$ can be introduced into the indicated multipliers at $A^2$, in which case the following connected summation members produce the expressions $B^2-C_2.A^2$ and $C_1.A^2-B^2$. The signs of these have to be supervised. Simple null limiting value switches $8a$ and $9a$ are provided for this sign supervision.

The formation of the amplitude quantities is based upon the expressions $A_1^2+A_2^2$ and $B_1^2+B_2^2$ and $I_1^2+I_2^2$, as will immediately be evident from the circuit design.

Figure 4:
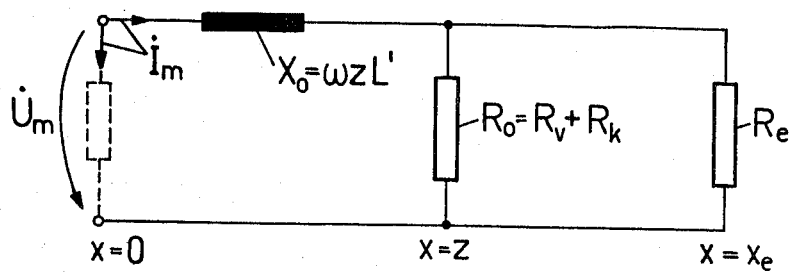
FIG. 4 is an equivalent circuit of the section of the line which is to be supervised.

For further explanation recourse will be had to the equivalent circuit of the supervised section of the line according to FIG. 4. According to this the line losses are incorporated in the form of an additional component $R_\nu$, together with the short circuiting resistance $R_k$, in the shunt resistance $R_o$, which represents a permissible simplification. Moreover it is assumed that the influence of the terminating resistance $R_e$ upon the conditions in the line section $x=O$ to $x=z$ is so small as to be neglected. For the series impedance of the line there remains then the reactance $X_o=\omega zL'$, with the inductive component $L'$, and for the input impedance $\dot{Z}_o=R_o+jX_o$ applies.

Figure 5:
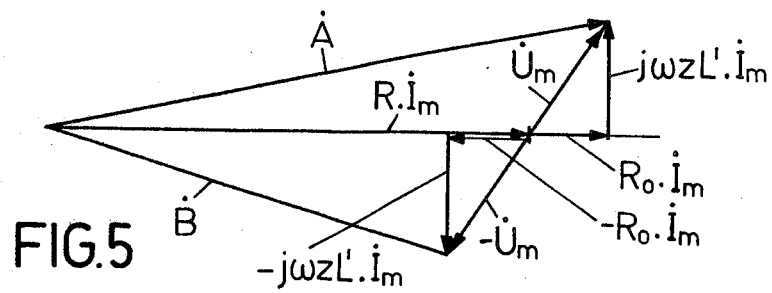
FIGS. 5, 6 and 7 show respectively a vector diagram for explaining the mode of action of the supervisory circuit under conditions of short circuit, operating and idle running.
Figure 6:
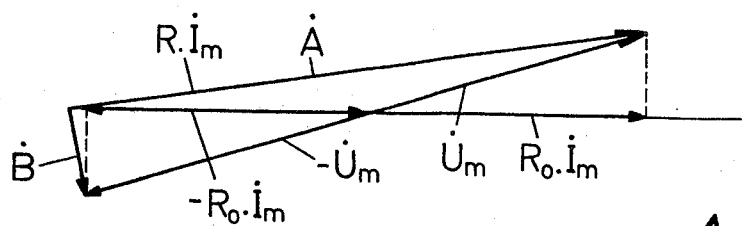
Figure 7:
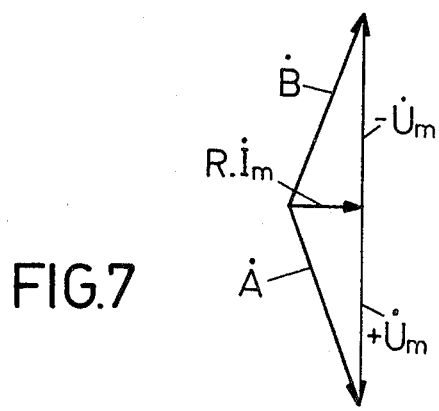

From this, result the vector diagrams of FIGS. 5, 6 and 7 for the complex auxiliary signals $\dot{A}$ and $\dot{B}$. These figures are in respect of the short circuit case, the operating case (here $R_o=R_e$ and $z=x_e$) and for the idle running case (here account is to be taken of the capacitive character of the input impedance and accordingly a measuring voltage $\dot{U}_m$ lagging behind $\dot{I}_m$, wherein also the magnitude of $\dot{I}_m$ is very small).

FIG. 5 shows that on account of the small phase angle between $\dot{A}$ and $\dot{B}$ and $\dot{I}_m$ respectively, it can be assumed that the components are in like phase with $\dot{I}_m$ when considering the ratio of the auxiliary signal amplitudes. The same consideration applies for the amplitude ratio auxiliary signal/current signal. This no longer applies for the conditions according to FIG. 6, but here the corresponding quotient is very large or very small. FIG. 7 finally shows that in the idle running condition the auxiliary signals are approximately of opposite phase, in contrast to the approximate identity of phase in the short circuit condition. This fact can be utilized for the purpose of an additional phase comparison for the purpose of distinguishing between the short circuit and idle running (see the phase detector in the circuit according to FIG. 2).

Figure 8:
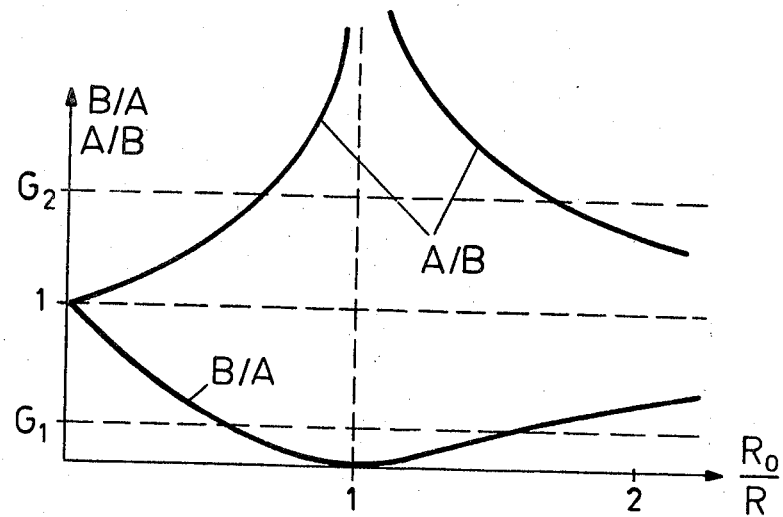
FIGS. 8, 9 and 10 show respectively a diagram of the curves of an amplitude comparison quantity, and of its reciprocal quantity, in dependence on the rate of input resistance to weighting resistance, of the current and voltage in an auxiliary signal.
Figure 9:
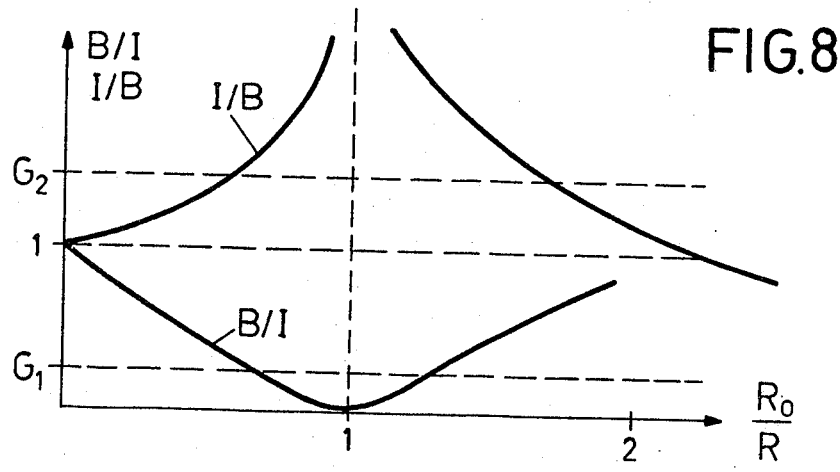
Figure 10:
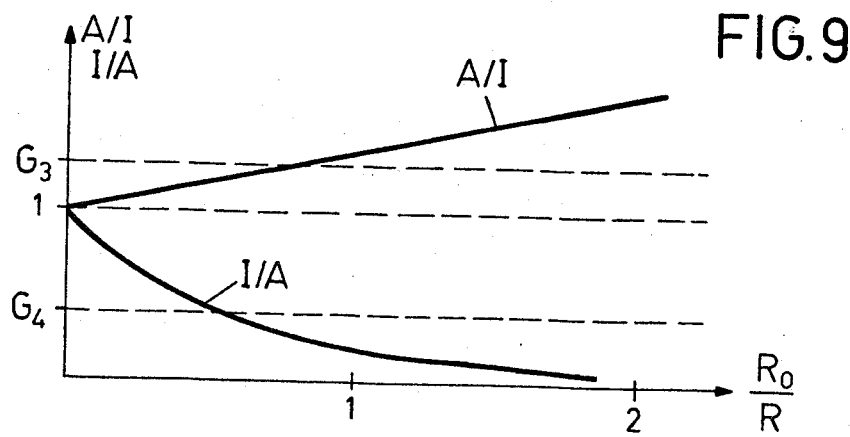

According to the functions of the various amplitude conditions, valid in FIGS. 8 to 10, which result from the consideration of the conditions in the vector diagrams of FIGS. 5 to 7, it is in any case possible, by making limiting value tests, to distinguish clearly the region of operating conditions from the short circuit and idle running condition in the vicinity of $R_o/R=1$. For the functions B/A and A/B this is possible in each case with a limiting value $G_1$ and $G_2$ respectively, in which case in addition it is necessary to make a distinction, by additional phase detection steps, between idle running at $R_o/R=1$ and short circuiting conditions with $R/R=0$. The same applies for B/I according to FIG. 9, but the function I/B allows, with two limiting value tests, a clear distinction of the short circuit case in contrast to the operating case and likewise with idle running. This applies also to the functions A/I and I/A according to FIG. 10, but this is basically possible even with recourse to only one limiting value $G_3$ or $G_4$.

Moreover, by suitable choice of the weighting factor R, the approximation of the vectors $\dot{A}$ and $\dot{B}$, or $\dot{I}$ to phase parity can be influenced in the sense of the above mentioned simplification according to the particular case for which it is applied. The choice of R equal to the characteristic impedance $R_w$ (assumed to be real) has, on the other hand, the special advantage that the time characteristics of a (O,t) and b(O,t) become more similar to each other in respect of harmonic oscillations and transients. In such case, the demands need not be so stringent in respect of quality of the filtering, for example correlative filtering, for deriving amplitude signals of a predetermined frequency. This applies particularly also with regard to the more or less complete compensation of the time displacement between the auxiliary signals, such as can be realized, for example, by means of the time member 72 within the integration circuit (see FIG. 2). Thus in the case of approximately congruent time characteristics of a and b, the amplitude ratio A/B again approximates to the value 1, even in the case of strong harmonic oscillation components in the auxiliary signals in the short circuiting case, while this ratio consequently departs in any case from the predetermined limiting value between the operating range and the short circuiting range.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalents of the following claims.

What is claimed is:

1. A method of supervising an electrical line for short circuits, comprising the steps of: deriving current and voltage signals ($i_m$ and $u_m$) from line current and line voltage at a measuring point ($x=0$), modifying relatively the current and voltage signals by multiplying at least one of these signals by a modifying factor (R or 1R) which is at least approximately free of phase rotation, forming at least one auxiliary signal (a or b) corresponding to the sum or difference in each case of a pair of relatively modified current and voltage signals ($R.i_m$, $u_m$ and $i_m$, $u_m/R$), performing an amplitude comparsion between said auxiliary signal (a, b) and a reference signal ($i_m$ or a), and generating a short-circuit signal (H) upon exceeding at least one predetermined limiting value ($C_1$, $C_2$) for the difference of the compared signals, or for a comparsion signal (F) generated during amplitude comparsion.

2. A method according to claim 1, wherein the modifying factor (R or 1R) is related to the current signal and the voltage signal and comprises a quantity at least approximately corresponding to the characteristic line resistance ($R_w$) or its reciprocal value ($1/R_w$).

3. A method according to claim 1, wherein two auxiliary signals (a, b) are formed by addition and subtraction respectively of a pair of relatively modified current and voltage signals, in the amplitude comparison step one of the auxiliary signals being used as a reference signal for the other.

4. A method according to claim 1, wherein an auxiliary signal (a or b) is formed by the addition or subtraction of a pair of relatively modified current and voltage signals, a current signal ($i_m$) being employed as a reference signal in the amplitude comparison step.

5. A method according to claim 3 including the step of forming a quotient from the auxiliary signal and the reference signal, and comparing the corresponding quotient signal with at least one limiting value.

6. A method according to claim 1, including the step of forming two mutually time displaced time integrals ($A_1$, $A_2$; $B_1$, $B_2$; $I_1$, $I_2$) for each auxiliary signal and reference signal and superimposing additively said integrals in a squaring or multiplying logic operation.

7. A method according to claim 6, wherein said amplitude comparison step comprises forming first the sum of the squares of two time integrals ($B_1^2+B_2^2$) of an auxiliary signal (b), forming secondly the sum of the squares of two time integrals ($A_1^2+A_2^2$ or $I_1^2+I_2^2$), and subjecting the first and second sums of the squares to a magnitude comparison, if necessary after multiplication by a limiting value factor.

8. A method according to claim 6, wherein the time integrals of the auxiliary signals and/or the reference signals are derived in form of relatively weighted and additively or subtractively logically processed time integrals (U, R.I) of the current and voltage signals ($i_m$, $u_m$).

9. A method according to claim 1, including the step of additionally comparing the phase difference between an auxiliary signal and a reference signal with a limiting value, and generating a short-circuit signal upon exceeding said limiting value.

10. A circuit arrangement for supervising an electrical line for short circuits comprising: a measuring station with measuring means for line current and line voltage quantities; transformers for converting said quantities into current and voltage signals; a multiplication or division circuit at least approximately free of phase rotation for relative modifying of the current and voltage signals; an adding or subtracting circuit connected to said multiplication or division circuit; a reference signal generator; an amplitude comparsion circuit connected to outputs of said adding or subtracting circuit and of said reference signal generator; said amplitude comparsion circuit being connected to at least one limiting value switch; a short-circuit signal being provided at the output of said limiting value switch when said limiting value is exceeded.

11. A circuit arrangement according to claim 10, wherein said reference signal generator comprises an additive logic circuit having an input side connected to relatively modified current and voltage signals ($R.i_m$, $u_m$).

12. A circuit arrangement according to claim 10, wherein said reference signal generator comprises a current signal transmission member.

13. A circuit arrangement according to claim 10, wherein said comparison circuit includes a circuit for forming amplitude signals, and a quotient former.

14. A circuit arrangement according to claim 13, wherein said circuit for forming amplitude signals comprises at least two time integrators for each input signal.

* * * * *